United States Patent [19]

Hashimoto

[11] Patent Number: 5,689,504
[45] Date of Patent: Nov. 18, 1997

[54] MOBILE RADIO COMMUNICATION SYSTEM AND CHANNEL CONTROL METHOD THEREFOR

[75] Inventor: Tadao Hashimoto, Tokyo, Japan

[73] Assignee: NEC Corporation, Tokyo, Japan

[21] Appl. No.: 572,062

[22] Filed: Dec. 14, 1995

[30] Foreign Application Priority Data

Dec. 21, 1994 [JP] Japan .................................. 6-318135

[51] Int. Cl.[6] .................................................. H04J 3/06
[52] U.S. Cl. ......................... 370/350; 370/509; 375/317; 375/354; 455/51.1
[58] Field of Search .................... 455/51.1, 56.1; 375/287, 317, 354, 362; 370/280, 345, 347, 350, 503, 509

[56] References Cited

U.S. PATENT DOCUMENTS

| | | | |
|---|---|---|---|
| 4,926,421 | 5/1990 | Kawano et al. | 370/95.1 |
| 5,220,564 | 6/1993 | Tuch et al. | 375/317 |
| 5,363,375 | 11/1994 | Chuang et al. | 370/350 |
| 5,459,762 | 10/1995 | Wang | 375/317 |

FOREIGN PATENT DOCUMENTS

| | | |
|---|---|---|
| 2241134 | 8/1991 | United Kingdom . |
| 2249926 | 5/1992 | United Kingdom . |

OTHER PUBLICATIONS

Derwent Abstract corresponding to JP 4207423 Jul. 1992.
Derwent Abstract corresponding to JP 59178828 Oct. 1984.

*Primary Examiner*—Benedict V. Safourek
*Attorney, Agent, or Firm*—Sughrue,Mion,Zinn,Macpeak & Seas, PLLC

[57] ABSTRACT

In a mobile radio communication system, a mobile station has a field level decision section which outputs a decision signal when the electric field level of a received signal exceeds a threshold level. A controller sequentially sets a plurality of different threshold levels. In response to the decision signal from the decision section, synchronization to the received control signal begins. When the mobile station receives down-going control signals from a plurality of base stations, it selects the one having the highest field level, and then sets up synchronization to the signal selected.

5 Claims, 6 Drawing Sheets

MOBILE RADIO COMMUNICATION SYSTEM AND CHANNEL CONTROL METHOD THEREFOR

BACKGROUND OF THE INVENTION

The present invention relates to a mobile radio communication system and a channel control method therefor and, more particularly, to a mobile radio communication system in which a mobile station interchanges control data and speech data with a plurality of base stations over a radio section implemented as a time division multiplex communication path, and a channel control method therefor.

A digital radio mobile communication system having a plurality of service areas or radio zones is conventional. It has been customary with this kind of system to interconnect a mobile station and base stations situated at the respective service areas by a time division multiplex radio communication path. Particularly, a TDMA (Time Division Multiple Access) system is extensively used for mobile radio communication. In the TDMA system, a plurality of base stations each intermittently sends a down-going control signal having a long bit synchronizing signal period. It is necessary for each mobile station to detect the down-going control signal from any one of the base stations, and synchronize its own waiting procedure to the detected control signal. This has customarily been done by the following sequence of steps. The mobile station sets up an all timing signals receipt state without regard to the TDMA synchronizing timing. Then, when the receipt electric field level of a received radio wave exceeds a fixed relatively low threshold level, the mobile station causes a bit synchronizing circuit built therein to operate at a high speed only for a predetermined period of time, thereby completing bit synchronization within the bit synchronizing signal period of a down-going control signal. Subsequently, the mobile station receives the control signal, and synchronizes its own waiting procedure to the control signal.

The problem with the conventional channel control method described above is as follows. The synchronizing procedure begins on the basis of the fixed relatively low threshold level, as stated above. Assume that on the power-up of the mobile station a down-going control signal from a base station far from the mobile station arrives at the mobile station earlier than a down-going control signal from another base station near the mobile station, while overlapping the latter. Then, the mobile station completes bit synchronization within the bit synchronizing signal period of the control signal arrived first and lower in electric field level than the control signal to arrive later. As a result, the mobile station cannot respond to the control signal sent from the near base station despite that it is higher in receipt electric field level than the preceding control signal. This prevents an optimal service to be offered to users.

SUMMARY OF THE INVENTION

It is therefore an object of the present invention to provide a mobile radio communication system which allows a mobile station to select, when received overlapping down-going control signals from a plurality of base stations, a signal having a high receipt electric field level, and then setting up synchronization to the signal selected, and a channel control method therefor.

In accordance with the present invention, a mobile radio communication system has a plurality of base stations and a plurality of mobile stations. The base stations each sends a down-going control signal at a predetermined period over the same radio channel implemented as a time division multiplex transmission path. The mobile stations each performs a waiting procedure at a period synchronous to the down-going control signal detected to thereby receive control data from any one of the base stations. The mobile stations each has a threshold setting section for storing a threshold electric field level. A controller sets a plurality of threshold electric field levels in the threshold setting section one at a time. A field level decision section outputs a decision signal when the receipt electric field level of a received signal exceeds the threshold electric field level stored in the threshold setting section. A demodulating section starts, in response to the decision signal, a procedure for setting up synchronization to the down-going control signal included in the received signal.

Also, in accordance with the present invention, in a mobile radio communication system of the type described, a channel control method has the steps of executing, when the receipt electric field level of a received signal exceeds a threshold electric field level, a procedure for setting up synchronization to a down-going control signal included in the received signal, and detecting the receipt electric field level, and executing a waiting procedure at a period synchronous to, among received down-going control signals, the down-going control signal having the highest receipt electric field level as determined on the basis of a plurality of threshold electric field levels.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
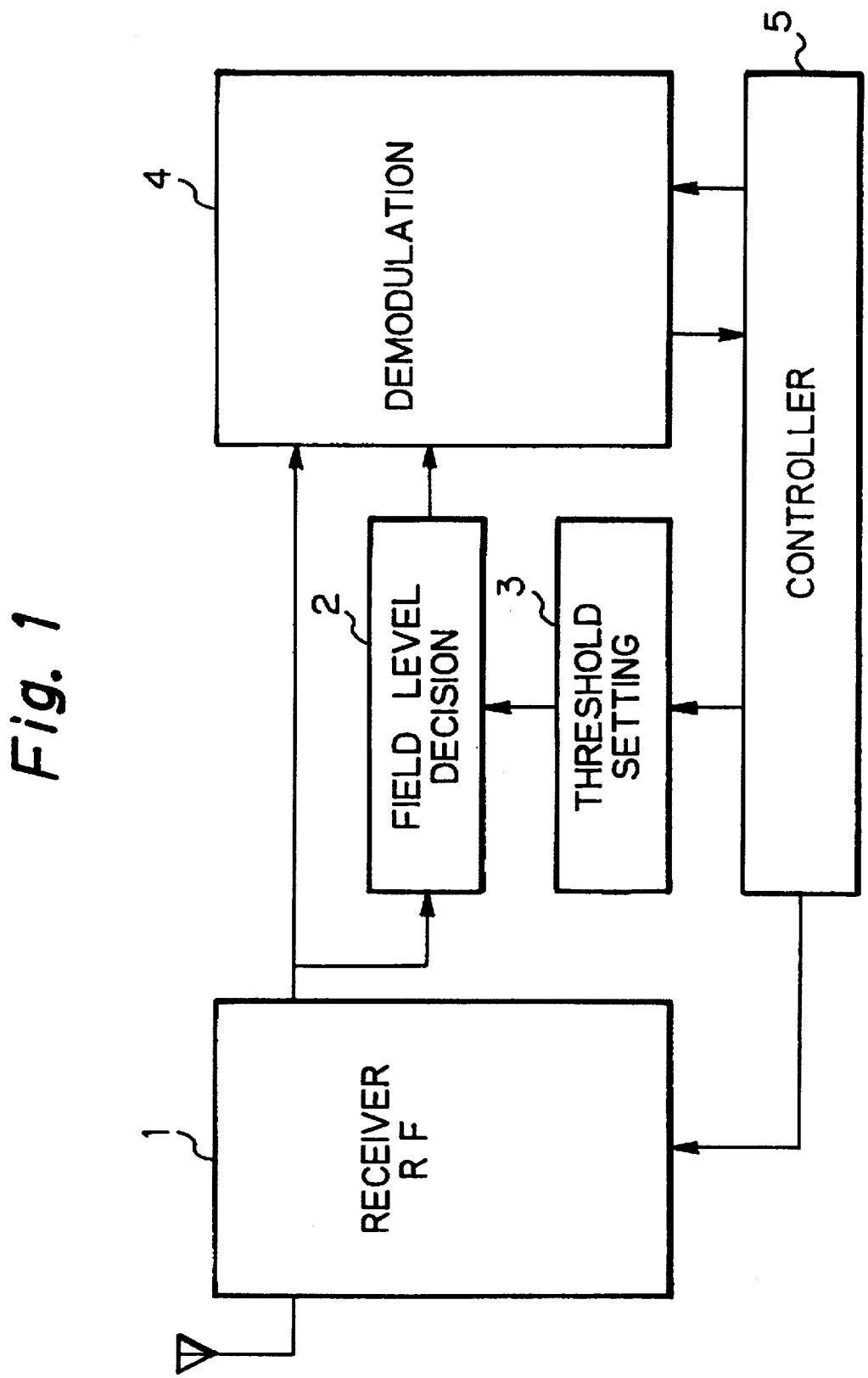
FIG. 1 is a block diagram schematically showing a receiver forming part of a mobile station which is included in a mobile radio communication system embodying the present invention.

Referring to FIG. 1 of the drawings, a mobile station included in a mobile radio communication system embodying the present invention, particularly a receiver thereof, is shown. As shown, the receiver has a receiver RF (Radio Frequency) section 1 for receiving a signal coming in through an antenna. A field level decision 2 determines whether or not the signal received by the receiver RF 1 has a higher electric field level than a predetermined threshold level set in a threshold setting 3. If the answer of this decision is positive, the decision 2 outputs a decision signal. A demodulation 4 detects, in response to the decision signal, a down-going control signal out of the signal fed from the receiver RF 1. Then, the demodulation 4 outputs demodulated data and demodulated clock when synchronization is set up. A controller 5 indicates the receiver RF 1 a radio channel for receipt, and sets the threshold level in the threshold setting 3 so as to select a base station whose electric field level is comparatively high.

Figure 2:
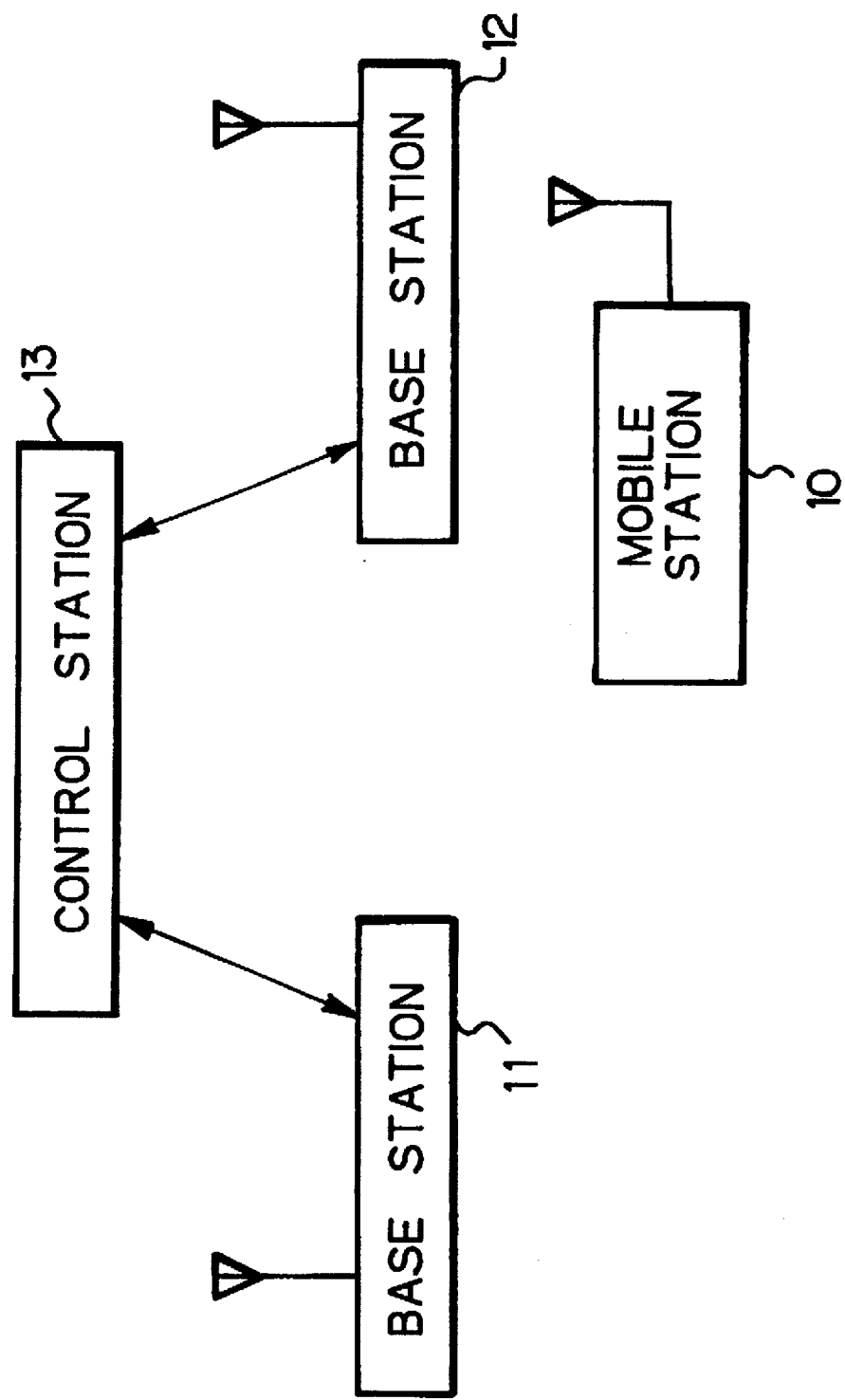
FIG. 2 is a block diagram showing a general mobile radio communication.

FIG. 2 shows a general mobile radio communication system. As shown, the system has a mobile station 10 provided with the construction shown in FIG. 1, base stations 11 and 12, and a control station 13 accommodating the base stations 11 and 12.

Figure 3:
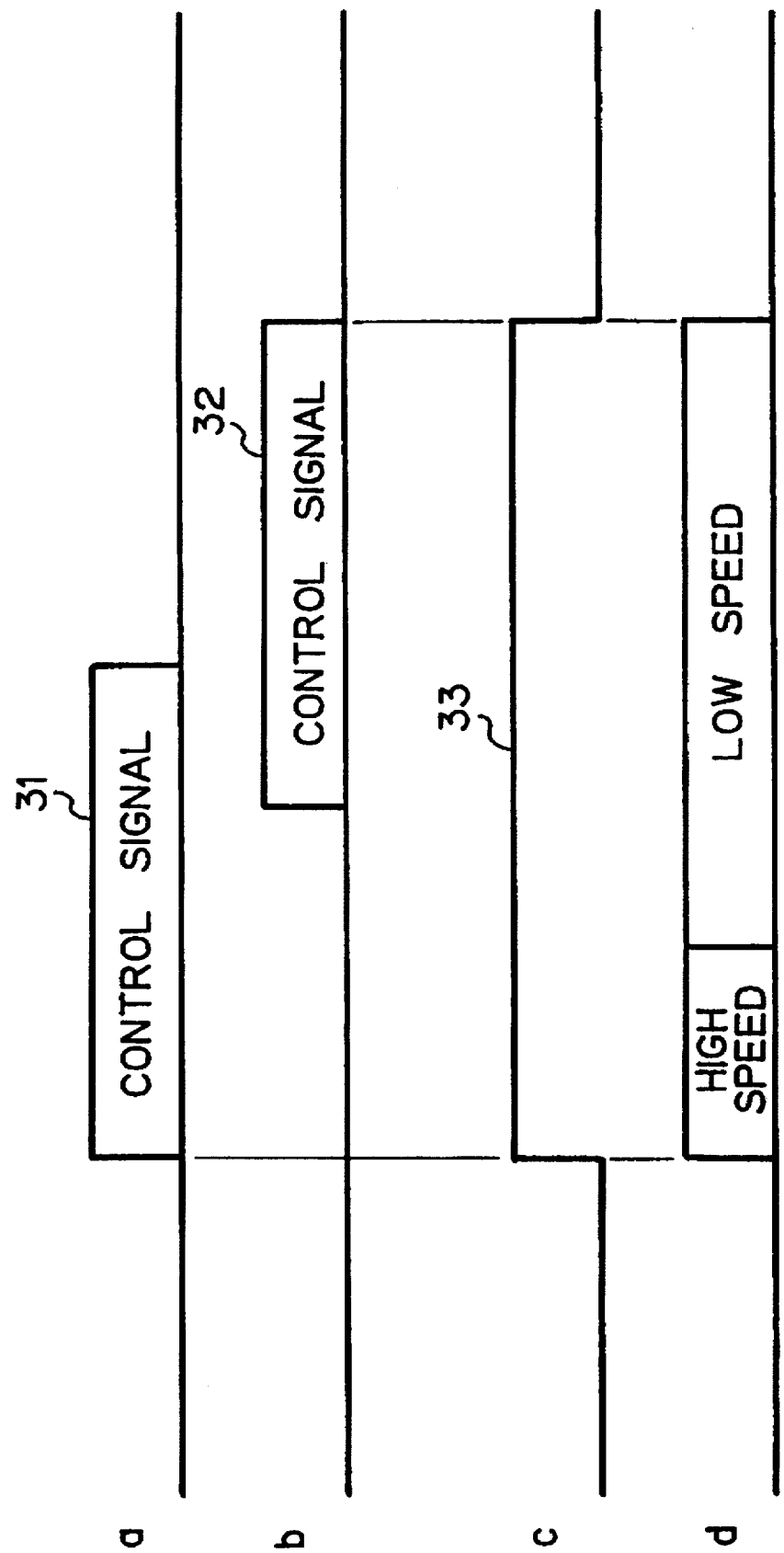
FIGS. 3 and 4 are timing chart representative of signals appearing in the receiver shown in FIG. 1.
Figure 4:
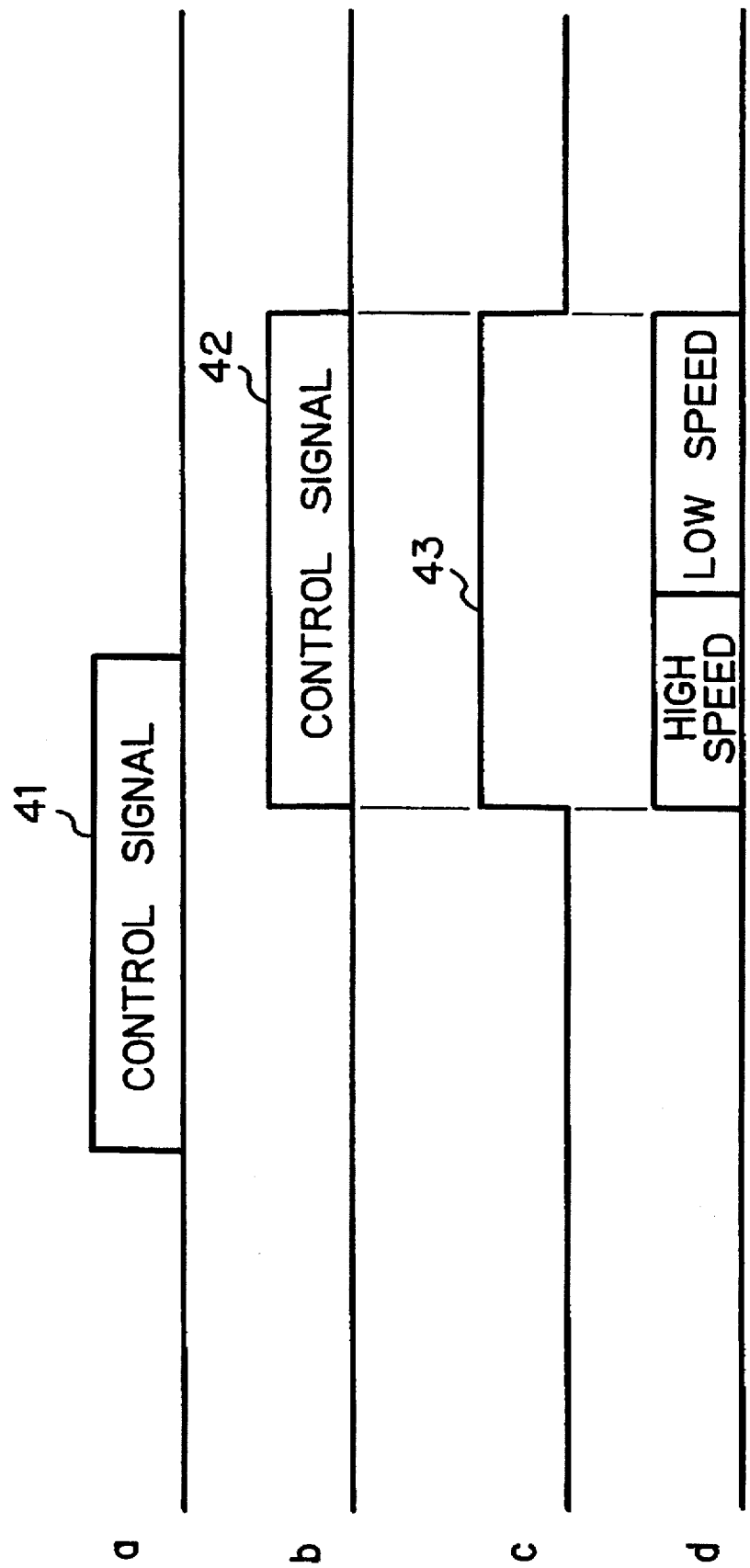

FIGS. 3 and 4 are timing charts representative of signals appearing in the mobile station shown in FIG. 1. There are shown in FIGS. 3 and 4 down-going control signals a, i.e., 31 and 41 received from the base station 11, down-going control signals b, i.e., 32 and 42 received from the base station 12, decision signals c, i.e., 33 and 43 output from the field level decision 2, and the operation d of the demodulation 4.

First, a reference will be made to FIG. 3 for describing an operation which the mobile station 10 performs when a comparatively low threshold level is set in the threshold setting 3 by the controller 5. As shown, assume that the base station 11 has sent the down-going control signal 31 first, and the base station has sent the down-going control signal 32 slightly later than the signal 31. Then, the receiver RF 1 receives the control signal 31 from the base station 11 first. The field level decision 2 compares the receipt electric field level of the signal fed from the receiver RF 1 with the comparatively low threshold level set in the threshold level setting 3. Hence, even through the base station 11 sent the control signal 31 is far from the mobile station 10, i.e., the received electric field level is low, the decision 2 outputs the decision signal 33 if the received level is higher than the threshold level. In response, the demodulation 4 starts setting up synchronization to the received signal, i.e., the control signal 31 output from the receiver RF 1.

Figure 5:
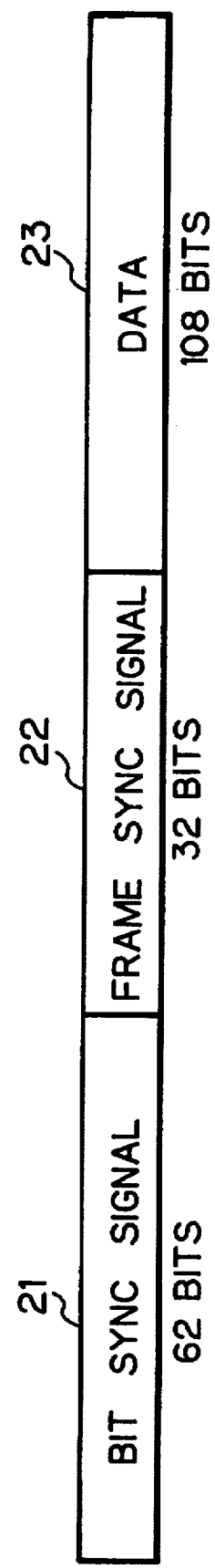
FIG. 5 shows a specific format of a down-going control signal.

FIG. 5 shows a specific format of the down-going control signals received from the base stations 11 and 12. As shown, the format consists of a frame 21 assigned to a bit synchronizing signal, a frame 22 assigned to a frame synchronizing signal, and a frame 23 assigned to data. The frames 21-23 each has a particular bit length. By utilizing the fact that the frame 21 of the control signal has a fixed length, the demodulation 4 causes a bit synchronizing circuit, not shown, included therein to operate at a high speed for a predetermined period of time after the positive-going edge of the decision signal 33. As a result, bit synchronization to the control signal 31 is set up. Subsequently, the demodulation 4 causes the bit synchronizing circuit to operate at a low speed in order to demodulate the frame synchronizing signal 22 and data 23, thereby outputting demodulated data and demodulated clock.

FIG. 4 shows a procedure to be executed when the threshold level set in the threshold setting 3 by the controller 5 is comparatively high. Again, assume that the base station 11 has sent the down-going control signal 41 first, and the base station 12 has sent the down-going control signal 42 slightly later than the signal 41. Then, the receiver RF 1 receives the control signal 41 from the base station 11 first. The field level decision 2 compares the receipt electric field level of the signal fed from the receiver RF 1 with the comparatively high threshold level set in the threshold level setting 3. In this case, the receipt electric field level is lower than the threshold level because the base station 11 sent the control signal 41 is far from the mobile station 10. Hence, the decision 2 does not output the decision signal 43. Subsequently, the receiver RF 1 receives the down-going control signal 42 sent from the base station 12. Then, the decision 2 outputs the decision signal 43 because the base station 12 sent the control signal 42 is closer to the mobile station 10 than the base station 11. In response to the decision signal 43, the modulation 4 starts setting up synchronization to the control signal 42 in the previously stated manner. On setting up the synchronization, the modulation 4 demodulates the frame synchronizing signal 22 and data 23, and thereby outputs demodulated data and demodulated clock.

As stated above, the decision 2 compares the electric field level of a received down-going control signal with each of a plurality of different threshold levels. When the decision 2 has detected a received signal whose field level is higher than the threshold level, the demodulation 4 starts setting up bit synchronization to the above control signal. Therefore, while a conventional mobile station has selected only a down-going control signal detected first, the embodiment selects, when received down-going control signals overlapping with each other, only one of them having a certain field level, and then sets up synchronization to such a control signal. This allows the mobile station to be connected to the base station having a stable received field level.

Figure 6:
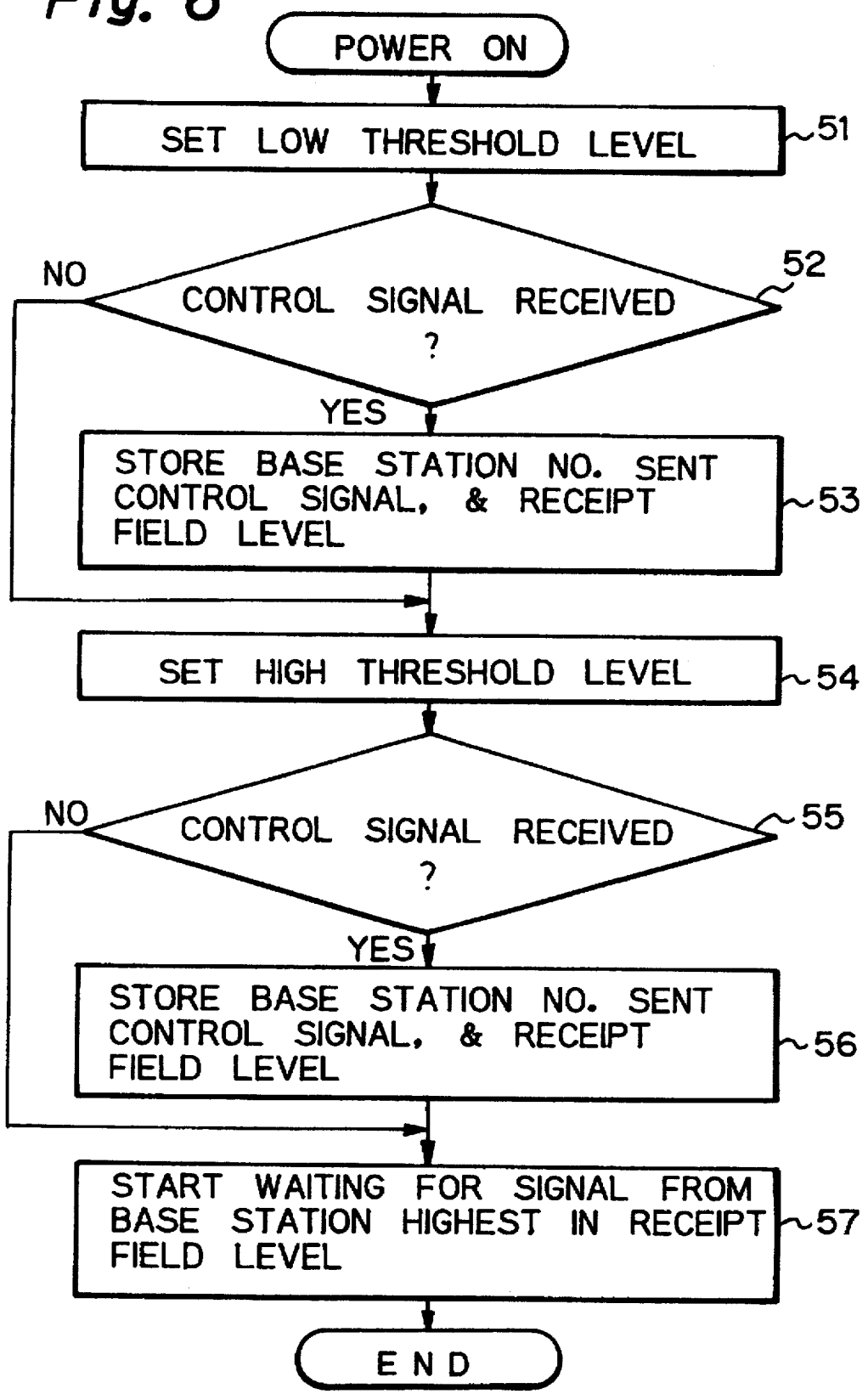
FIG. 6 is a flowchart demonstrating a specific demodulation procedure to be executed by the embodiment.

Referring to FIG. 6, a specific demodulation procedure available with the embodiment will be described. Briefly, by the procedure to be described, optimal one of a plurality of down-going signals received immediately after the power-up of the mobile station is selected. As shown, on the power-on of the mobile station, the controller 5 sets the comparatively low threshold level in the threshold setting 3 (step 51). Then, the field level decision 2 starts determining whether or not the receiver RF 1 has received a down-going control signal (step 52). If the answer of the step 52 is positive, and if the received control signal has a higher electric field level than the threshold level (YES, step 52), the decision 2 outputs the decision signal 43. In response to the decision signal 43, the demodulation 4 sets up synchronization in the previously stated manner, and obtains a base station number included in the data 23 of the control signal. Further, during the receipt of the control signal, the demodulation 4 detects the level of the received electric filed.

On receiving the base station number and field level from the demodulation 4, the controller 5 stores them together with the time when the control signal has been received (step 53). Hence, when a plurality of down-going control signals overlap with each other, as stated with reference to FIG. 3, synchronization to the control signal 31 received first is set up, and data relating thereto are stored. After the storage or if no down-going control signals are detected (NO, step 52), the controller 5 replaces the comparatively low threshold level set in the threshold setting 3 with the comparatively high threshold level (step 54).

Subsequently, as in the steps 52 and 53, the decision 2 compares the received signal with the comparatively high threshold level, and the demodulation 4 sets up synchronization to the down-going control signal. As a result, a base station number and a receipt field level are output, and then stored by the controller 5 together with the time when the control signal has been received (steps 55 and 56). Hence, when a plurality of control signals overlap with each other, as stated with reference to FIG. 4, synchronization to the control signal 42 having a high receipt field level is set up, and data relating thereto are stored. After the storage, or if no control signals are detected (NO, step 55), the controller 5 selects one of the stored base stations which has the highest receipt field level. In this condition, the mobile station waits for a signal from the base station selected (step 57). At this instant, the base station sends the control signal at predetermined intervals. Therefore, the controller 5 commands, based on the stored time of receipt, the demodulation 4 to set up synchronization within the period in which the desired control signal is received.

Consequently, the demodulation 4 sets up synchronization to the down-going control signal having the highest received field level. Thereafter, the mobile station starts waiting for a signal from the base station on the basis of the time of receipt of the above control signal. In this manner, the mobile station stores the received field level of the individual control signal detected on the basis of a particular threshold level, and then selects the control signal having the highest field level. Hence, the mobile station can select the control signal highest in field level even when a plurality of control signals appear concurrently.

In summary, in accordance with the present invention, a mobile station has a field level decision section which outputs a decision signal when the receipt electric field level of a received signal exceeds a threshold level. A controller sequentially sets a plurality of different threshold levels. In response to the decision signal from the decision section, synchronization to the received control signal begins. While a conventional mobile station selects only a down-going control signal detected first, the present invention selects, when received down-going control signals overlapping with each other, only the control signal having a certain field level, and then sets up synchronization to such a control signal. This allows the mobile station to be connected to the base station having a stable receipt field level.

Further, the mobile station waits for a signal with a period synchronous to, among control signals detected on the basis of a plurality of different threshold levels, the control signal having the highest receipt field level. Hence, even when a plurality of down-going control signals overlap with each other, the mobile station can select the control signal having the highest receipt field level.

Various modifications will become possible for those skilled in the art after receiving the teachings of the present disclosure without departing from the scope thereof. For example, while the embodiment has been shown and described as setting the comparatively low threshold level first and then the comparatively high threshold level, the former may be set after the latter, if desired. Further, in the procedure of FIG. 6, the steps 52 and 53 and the steps 55 and 56 may each be repeated with the other down-going control signals, and then respectively followed by the steps 54 and 57 when no other control signals are detected. In addition, three of more consecutive threshold levels may be used in order to select optimal one of down-going control signals sent from a number of base stations.

What is claimed is:

1. In a mobile radio communication system having a plurality of base stations and a plurality of mobile stations, said plurality of base stations each sending a down-going control signal at a predetermined period over a same radio channel implemented as a time division multiplex transmission path, said plurality of mobile stations each performing a waiting procedure at a period synchronous to the down-going control signal detected to thereby receive control data from any one of said plurality of base stations, said plurality of mobile stations each comprising:

a threshold setting section for storing a threshold electric field level;

a controller for setting the threshold electric field level, from a plurality of threshold electric field levels, in said threshold setting;

a field level decision section for outputting a decision signal when a received electric field level of a received signal exceeds the threshold electric field level stored in said threshold setting section; and a demodulating section for starting, in response to said decision signal, a procedure for setting up synchronization to the down-going control signal included in the received signal.

2. A system as claimed in claim 1, wherein said demodulating section outputs the received electric field level of the down-going control signal when the synchronization is set up, and wherein said mobile station performs the waiting procedure during a period synchronous to the down-going control signal selected by said controller so as to receive control data from at least one of the base stations.

3. A channel control method for a mobile radio communication system having a plurality of base stations and a plurality of mobile stations, said plurality of base stations each sending a down-going control signal at a predetermined period over a same radio channel implemented as a time division multiplex transmission path, said plurality of mobile stations each performing a waiting procedure during a period synchronous to the down-going control signal detected to thereby receive control data from any one of said plurality of base stations, comprising the steps of:

receiving down-going control signals;

executing, when a received electric field level of a received signal exceeds a threshold electric field level, a procedure for setting up synchronization to a down-going control signal included in the received signal, and detecting the received electric field level; and executing a waiting procedure during a period synchronous to a down-going control signal having the highest received electric field level as determined on the basis of a plurality of threshold electric field levels in order to receive control data.

4. A program for controlling synchronization of a mobile communication unit, comprising the steps of:

setting a first threshold value;

receiving a first control signal transmitted from a first base station and determining received electric field level of the first control signal;

if the electric field level of the first control signal exceeds the first threshold value, setting up synchronization to the first control signal and replacing the first threshold value with a second threshold value higher than the first threshold value;

receiving a second control signal transmitted from a second base station and determining received electric field level of the second control signal; and, if the electric field level of the second control signal exceeds the second threshold value, setting up synchronization to the second control signal.

5. The program according to claim 4, wherein the first and second control signals include identification numbers of the first and second base stations, respectively, and wherein the program further comprises the steps of storing the identification numbers included in the control signals, the electric field level of the received control signals, and the time each control signal has been received.

* * * * *